Oct. 30, 1962  R. W. HENNING ET AL  3,060,437
SWING JAW SAFETY FIXTURE
Filed May 21, 1958  6 Sheets-Sheet 2

INVENTORS:
ROBERT W. HENNING
HERBERT L. IVINS

By Lionel L. Goff
John E. Wiekins
ATTORNEYS

INVENTORS:
ROBERT W. HENNING
HERBERT L. IVINS
By Lloyd E. Goff
John D. Wilkins
ATTORNEYS Oct. 30, 1962  R. W. HENNING ET AL  3,060,437
SWING JAW SAFETY FIXTURE
Filed May 21, 1958  6 Sheets-Sheet 4

INVENTORS:
ROBERT W. HENNING
HERBERT L. IVINS

By Lionel E. Goff
John D. Wilkins
ATTORNEYS

Oct. 30, 1962  R. W. HENNING ET AL  3,060,437
SWING JAW SAFETY FIXTURE

Filed May 21, 1958  6 Sheets-Sheet 6

INVENTORS:
ROBERT W. HENNING
HERBERT L. IVINS
BY
Leonard E. Goff
John D. Williams
ATTORNEYS United States Patent Office 3,060,437
Patented Oct. 30, 1962

3,060,437
SWING JAW SAFETY FIXTURE
Robert W. Henning, Fairview, and Herbert L. Ivins, Brooklyn, Ohio, assignors to Olin Mathieson Chemical Corporation, Cleveland, Ohio, a corporation of Virginia
Filed May 21, 1958, Ser. No. 736,759
17 Claims. (Cl. 1—44.5)

This invention relates to improvements in powder-actuated fastener driving tool and more particularly to a powder-actuated tool having an arresting arrangement to restrain the projected fastener against free flight.

Tools of the explosive operated type have been developed to sink a fastener such as a stud, pin, or the like into steel, wood or materials of suitable character and have found wide application in many fields such as the construction industry and in the maintenance field. Although such tools like any other tool are quite safe when properly employed, especially when such tools include one or more safety features, there has always been a need for an ultimate in safety provisions for these types of tools where the most improbable, and the least favorable operating conditions are encountered no matter how rarely. A tool with a factor of safety against any foreseeable possibility of allowing a fastener to escape into free flight will extend the use of such tools without limitation into areas of operation where their introduction would be welcome, but which have been heretofore closed, provided the super-added safety does not interfere excessively with routine fastening. The present invention provides exactly such a tool in accordance with an entirely new concept in safety operation without impairment of ease of operation.

One of the objects of the present invention is to provide a powder-actuated tool including a drivable unit wherein a fastener driven thereby cannot escape into free flight in the event that unexpected ease of penetration into parts to be fastened together is encountered either because of an unforeseeable variation in the character of the material of the work surface or because of an inadvertent excess of powder.

Another object is to provide an explosive operated tool of any suitable stud driving type wherein the fastener remains free for projection into the work surface for fastening purposes, but is automatically and dependably rendered captive when there is danger of overpenetration.

Another object is to provide a tool so arranged and functioning for safety purposes as to be adapted to check the passage of the fastener only in the event that the emergence of the fastener from the muzzle zone of the tool proceeds beyond a certain predetermined position.

Another object is to provide the tool with a new and an improved automatic safety arrangement which will permit the tool to be reinstated quickly for continued operation and will not require disassembly following an occasional emergency because it does not put the tool into so abnormal a condition when the safety parts go into operation as to require a subsequent disassembly operation to return the tool to a normal operating condition.

Still another object is to provide a tool of improved safety having no expendable safety parts requiring replacement in the event the safety is called into emergency operation before the tool can be put back into routine operation and wherein the replacement is of the easiest type of a part independently of the tool assembly and obviating any long delay because of need of an overhauling of the tool preparatory to subsequent routine operation.

A still further object is to provide such a tool wherein operation is automatically prevented in the event that the operator inadvertently omits utilization of the safety elements.

Still another object is to provide such a tool wherein overdriving because of overpenetration is prevented within tolerable limits so as to avoid an oversensitivity to normally encountered variations in dimensions and resistances to penetration.

Still another object is to provide a built-in automatic safety responsive only upon occurrence of a clear-cut emergency, but not hampering otherwise routine operation excessively.

A further object is to provide an emergency fastener braking device reliable and quick acting, but of a sufficiently gradual decelerating character so as not to damage any part of the tool and thereby give rise to excessive tool maintenance.

A further object of the present invention is to provide a powder-actuated tool with an abutment arrangement which is inertia operated for actually seizing a fastener on the verge of going too far beyond a predetermined distance from the muzzle of the tool.

A still further object of the present invention is to provide such a tool with an abutment arrangement movable to an operative position to allow the fast flight of a drivable unit such as a fastener in but not out of the tool when the tool is put into firing position, but which is movable to a position for easily releasing the unit, after captivation on the verge of free flight, without offering interference of any kind, unless the driving proceeds improperly.

A still further object of the present invention is to provide a tool characterized by speed and ease of operation with respect to the feeding of fasteners to the tool driving, and disengagement of the tool from the fasteners without requiring any special auxiliary devices forming a part of the tool and requiring time consuming extra steps of fastener seating and extrication with respect to the tool.

Other objects and advantages of this invention, such as the relatively simple structure and design of the safety arrangement and of its parts for carrying out their functions in accordance with this invention will be apparent from the drawing and description of the specific embodiment as illustrated in the accompanying drawing wherein.

In accordance with this invention a high velocity type of explosive actuated fastener driving tool is provided with a safety arrangement which is normally inactive so as to provide the least complication of tool operation, but which goes into action promptly when there has been the slightest amount of an excessive overpenetration and which is adapted thereupon for positively stopping the projected fastener or stud at the muzzle before it has had a chance to become a run-away element. The concept for doing this is to effect a deformation of a plastic element by the act of stud over-travel to upset the element into coupled relationship with the stud. This is done by effecting a plastic deformation which not only absorbs the shock of stopping such an improperly projected fastener, but also actually forges a safety link which seizes the fastener and tethers it in the event of any manifestation that the fastener is meeting abnormally little resistance to penetration or is overpowered because of use of too powerful a propellant gas generating cartridge and is, therefore, potentially projectable in free flight.

According to a presently preferred embodiment, there is provided a deformable traveling element and a stationary element deforming means both operative responsively to over-driving. The element takes the form of a driving piston or follower member for propelling the fastener in coaction with a specially shaped orificed stopping portion which operates as a deforming die for plastically shaping part of the piston into retaining relationship with the propelled fastener. In length the piston is made sufficient but no longer than necessary to undergo the severest deformation to be encountered. In diameter it is proportioned to adequately hold the stud. Both fastener and piston are maintained in operative proximity in any suitable manner such as by provision of a drag element on the fastener to keep it from outracing the piston follower. Optionally means for retaining the piston and fastener may also be provided.

The piston is a strong plastic member formed of a suitable material such as a soft steel or the like. The piston has a recess at least at one end for normally receiving the end of the fastener in slidable or easily insertable and separable relationship, but to double the usability of the piston and make its use more convenient and less likely to be in error, the piston is preferably recessed at both ends thereby making it a reversible unit.

By making the expendable braking cylinder operatively shaped at both ends for coaction with the fastener it may be inserted slidably after the stud into the barrel either end foremost and next to the stud in telescoping operable relationship. This has the further advantage of avoiding the danger of inadvertent insertion in reverse in inoperative relationship and eliminates the need for exercise of a great deal of care to avoid such reversal. Each open-mouthed end forms a socket receiving a part of the stud. Either the recess or the fastener end portion may be flanged or contain a ring of resilient material such as a rubber O-ring to better retain the parts together by friction or in any other separable way. The piston is adapted to be loaded into the tool barrel along with the fastener or stud and following the stud with the cylindrical side wall surrounding the recess in collapsible and normally detachable relationship with respect to the end of the stud and with the bottom of the recess in abutment with the end of the stud for pushing the stud along, but the piston is of cylindrical shape and its edges at the ends on the interior at the recess are rounded off so as to offer no interference to the reception of the end of the stud in the recess in operative telescoping relationship. To facilitate reception, the mouth of the recess may be flared and the mating end of the fastener may be conically shaped by beveling, for example, to a streamline form free from a stress concentrating point.

At least the outer surfaces of the cylindrical shaped piston are protectively coated, preferably by a coating such as copper which also is of a lubricating nature with respect to the jaws of the abutment member or stopping die. It will be understood that other coating materials which will prevent rusting and corrosion and which will not interfere with the action between the braking cylinder and the braking die are also contemplated. While preferred, coating is not essential.

A suitable drivable and cooperable fastener is one having a hardened and toughened penetrating shank portion of suitable treated metal such as specially heat treated steel made by a process generally known as "austempering," a tradename, and a rear end graspable portion which preferably is advantageously enlarged to provide a more positive penetration limit gaging shoulder intermediate the shank and rear-end enlargement. The graspable portion is preferably screw-threaded and terminates in an end face substantially free from any sharp edges so as not to prevent operative reception of the enlarged end in the recess of the braking cylinder piston. Advantageously the end may be a rounded protrusion for better guiding the parts together into the mouth of the piston socket or recess.

The stud is provided with any yieldable drag means integral or separate from the fastener which will drag on the barrel bore and allow insertion and positioning of the fastener in the barrel without interfering with the action of the die; this helps insure that the fastener will not move ahead faster than the piston out of operative proximity. The drag means preferably is of a type offering no resistance to penetration and is pervious to the motivating fluid and a suitable device for the purpose is any one of a number of perforated, slotted or scalloped devices such as the pliant nose cone or tip disclosed in the co-pending application of Charles J. DeCaro, Serial No. 493,254, filed March 9, 1955, now U.S. Patent No. 2,968,984, granted January 24, 1961; such tip of easily deformed character was found eminently suited for the purpose. Sabot means on the trailing end of the fastener frictionally or adhesively retainable in the piston recess is also contemplated provided it not be of a type impairing the inchoate gripping relationship desired from deformation of the piston in the safety die or jaws at the tool muzzle subsequently.

The abutment means or die member secured to the tool at the muzzle for stopping the elongated braking piston is adapted upon overpenetration to forge the piston into firm coupling with the stud by a shaping action involving extrusion of at least the leading cupped or recessed or otherwise operatively connectable end with concomitant swaging here shown inwardly, of the walls of the recess about the fastener so firmly as to join these parts substantially permanently as a disposable unit.

The abutment means performs either a metal extruding or raking or merely an ironing operation on the piston and by thus acting on the piston automatically intercepts and captures a potentially run-away fastener which remains captively linked to the tool by the deformed piston. The driving power is largely dissipated in the extrusion, raking or ironing. The deformation also is accompanied by swaging of the piston socket about the stud.

The resultant grip may vary from a strong frictional fit to one preferably enhanced to a most positive connection by provision of roughness, knurls, pitting, an enlargement such as an end knob or button, circumferential grooves and/or ridges, but preferably of threads on the end of the stud. It will be appreciated that threads additionally provide a standard type connection for other workpieces for general fastening purposes with the driven stud. The trailing end of the stud thus is shaped to provide in effect a handle portion adapted to be gripped by the inwardly forged end of the piston upon its delivery to the stopping die upon overtravel of the stud.

To make the tool easy to put back into service and as soon as possible after an overpenetration has occurred, the intercepting die member is preferably of the split type having die segments or swing jaws forming a ring-shaped piston draw die the piston working parts of which are swingable out of the path of the normally undeformed piston which has done its driving function and is discharged from the muzzle ready for reloading into the breech. These jaw parts are also swingable into the future path of any piston, should there be an overpenetration, as a condition precedent to the operation of the tool where they are disposed in abutment with the surface of the workpiece and into abutment with the muzzle end of the barrel. This end also serves to lock the jaws into the normally intercepting position so long as the tool is thrust against the workpiece in position for fastener driving. The jaws are pivotally and axially slidably mounted on a ring or pivot pins carried on a yoke or frame movably carried in turn on the barrel in a way permitting the muzzle end of the barrel to move forwardly relative to said frame, i.e. to permit the frame to assume a position rearwardly relative to the barrel muzzle in actual tool operation, and to permit the housing of the tool, which usually carries the tool firing controls to move to a limited extent relative to both said frame and barrel.

The jaws are L-shaped in part and are pivoted on pins to operate somewhat like a bell crank lever at one end of an arm of each of which there is a metal working die surface and at the other end of the other arm of which there is a cam follower surface for coaction with a lateral cam surface at the muzzle end of the barrel so that when the barrel is moved in one direction toward the die opening the die surfaces are moved together like segments of an orifice shutter to form the die orifice and are locked in this articulated position firmly enough to resist opening of the braking piston obstructing hole by any force exerted by the arrested piston. Specifically, the jaws are locked in operating position by setting the front of the barrel into the inlet end of the central opening of the jaw assembly. The leading end of the barrel adjacent the muzzle and forwardly of enlarged lateral cam surfaces is cut away to a taper so that upon retraction of the barrel away from the jaws, the jaws are enabled to rock on their pins sufficiently to open the die orifice to a normal piston passing position, sufficient to not only permit removal from the bore of a normally undeformed piston, but to also permit removal of a deformed piston with its captured stud from the jaws.

For this purpose the muzzle of the barrel is enlarged to form a cylindrical cam surface and the tapering or chamfered tip.

For convenience the entire arrangement may be set up as a unitary fixture preferably with a box-like guard suitable for each particular type of tool available. For example, for the tool of the type shown in our co-pending application Serial No. 551,417, filed December 6, 1955, the fixture consists basically of an interchangeable barrel, a U-shaped relatively heavy jaw-supporting yoke with a barrel opening and a yoke tube coaxially arranged about the barrel in alignment with said barrel opening for receiving a barrel spring, spaced cross pins carried in said yoke transversely spanning the jaw receiving space between the forwardly extending legs of the yoke, a slotted jaw segment pivotally mounted on each pin, and sometimes a guard or shield preferably with a forwardly extending skirt and preferably removably mounted on the yoke and its tube. The yoke and tube are fixed together as by welding and this unit is mounted on the barrel so that the enlarged end of the barrel is constrained axially with limited movement between the mounted jaws and the bight of the yoke. The entire fixture can be installed on the tool either interchangeably with the regular barrel or other like fixtures with different barrel bore sizes or as a permanent part of the tool.

It will be understood that axial slotting may be provided in the legs of the yoke instead of in the jaws; and in another embodiment for obtaining a still further advantage this may be done and the jaws then are mounted to merely pivot on the pins. As a further modification, the ends of the pins may be interconnected by a pair of spaced side bars disposed with the pins in a sort of sprocket-chain-link-shaped structure. The ends of the pins may be fixed to the bars to more positively prevent any relative movement, so that the rotatable jaws may slide forwardly and rearwardly to a limited extent only in unison, where such action is desired for handling the most unusual fastening installations.

The metal working surfaces of the jaws may have any suitable shape, but in any event consist of segments of a draw or extrusion die having either a cylindrical bore with a beveled inlet or a funnel shaped or frusto-conical or paraboloid bore with or without a relatively accurately sized straight walled cylindrical throat intermediate the ends or at or nearer the terminal end of the bore. A suitable bore consists of a relatively steeply tapered relatively long inlet portion a relatively short cylindrical restriction of accurate size for better accuracy and wear resistance than a sharp knife edge restriction, and a relatively short more flared tapered outlet portion.

Adjacent the inlet of the die, the jaws form a socket for reception of the cam surfaced muzzle end of the barrel.

The deforming jaws are formed of a very tough hardened tool steel and are preferably of either spring or swinging type and with limited axially separating relative movement between the jaws and the front end of the barrel so as to adapt the device for articulation giving the easiest extrication of the tool from the deformed soft steel braking element and readying of the tool again for return to service with a minimum of delay with the least need for replacement of expendable parts. If the jaws are of the spring type they may be reed-like elements sprung either inwardly or outwardly, preferably the latter.

Figure 24:
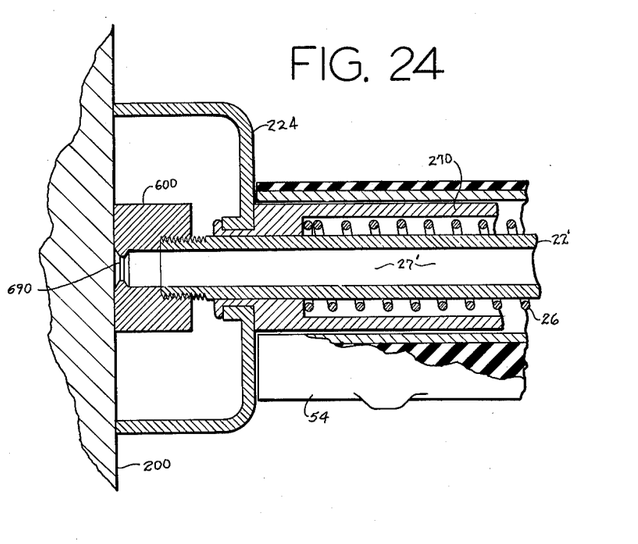
FIG. 24 is a fragmentary longitudinal cross sectional view of the front part of the tool, similar to FIGURES 3 and 4, showing a unitary safety fixture mounted at the tool muzzle and positioned against the surface of a workpiece.

The deforming member may be, however, a unitary detachable attachment (FIGURE 24) such as an annular draw die member 600 adapted to perform the coupling function by swaging and the energy dissipating function by drawing, ironing, extrusion, rolling, raking or other plastic deforming operation on the billet-like stopping or braking member. Such a die may be screw-threadedly attached as a muzzle piece 600 or preferably a flat-sided nut member, which need not be detached except in the event of an overpenetration then may be detached easily from the muzzle along with the plastically deformed braking cylinder when it is caught in the annular die of the drawing orifice 690. This form of die member may be assembled at the muzzle of bore 27' of barrel 22' together with a shield 224 carried on the tube 270 including the biasing spring 26 and also mounted on the barrel 22'. For this embodiment the cylinder may be adapted to be pushed back to the breech together with a fastener loaded from the muzzle to ready the tool for the next firing. The sizing throat might be located for this embodiment nearer the muzzle so as to accomplish sizing near the terminal part of the explosive power stroke instead of initially.

The expendable flight braking cylinder consists of any readily deformable strong tough material such as machineable metal, preferably a soft low carbon steel such as a machining stock known to the metal trade as "Ledloy" containing an average of about 0.25% lead within the range from about 0.15% to about 0.3% or any one of a number of high speed screw steels such as those containing about 0.082–0.2% carbon, about 0.3–0.8% manganese, up to about 0.12% phosphorus, about 0.66–0.12% sulphur and the balance iron. This is preferably flash plated or otherwise coated with a thin layer of copper. A thickness of about 0.0002 of an inch was found suitable.

The piston is shaped as an elongated cylinder of not only sufficient strength and plasticity, but also of sufficient length and dimether to enable it to undergo the severest deformation by extrusion and elongation and the severest diametrical reduction possible with the maximum driving charge and the minimum resistance encountered, i.e. with no workpiece target at all, and to include the necessary length of recess and stud gripping sidewall thickness about the recess without any separate part or all of the piston passing completely through the jaws of the abutment member. For a tool having a barrel bore of about .38 caliber a copper plated readily machinable "Ledloy" steel cylinder of about 0.365 of an inch nominal diameter (about from 0.3652 to 0.3665 of an inch) of a length in the range of from about 1½ of an inch to about from 2–3 inches, but preferably about 1¾ of an inch, was found capable of serving the purpose, together with a two-jawed orifice having an operative diameter of from about 0.310 to about 0.312 of an inch with the corners at the die split chamfered to prevent chipping and unpredictable variations in stopping power. The jaw surfaces are preferably treated with a rust preventative. The piston may consist of any suitable metal of adequate tensile strength and corrosion resistance and may be a copper or aluminum-base alloy with workability improving agents such as sulfur, lead or tellurium.

The cylindrical proportions of the piston may vary from a combination of larger diameter and smaller length to a combination of smaller diameter and longer length. The latter is preferred as it gives a more gradual deceleration. The diameter must be large enough and the socket small enough to leave a socket wall strong enough to hold the fastener.

The socket in the piston is made by using a drill of the same size as the size of the threaded end of the stud. For example, for a ¼ inch threaded end stud a drill for making a ¼ inch hole is used. A clearance of not more than a few thousandths of an inch is permissible.

The socket end of the piston is relatively free from sharp corners both internally and externally to avoid interference with free reception of the stud in the socket and to avoid excessive stress concentrations. For this reason, the bottom of the socket is beveled or rounded. The depth of the socket is critical to development of both (1) an adequate grip and (2) a normal slight overdrive tolerance of the clearance space between the front end of the piston and the surface of the workpiece for fasteners with the shortest terminal rear-end portion. This clearance space must be adequate to receive the die structure surrounding the deforming orifice of the jaws without causing premature meeting of the piston and jaws in the event of a slight overpenetration within permissible limits. Otherwise the tool may become oversensitive for the family of explosive driven studs characterized by the shortest threaded end portion.

A depth of socket for a ¼ inch size of threaded stud of about 9/32 of an inch was found satisfactory for the above dimensioned piston giving an overdrive tolerance slightly more than about ⅛ of an inch.

Although a separate arrangement of stud and piston with a socket having only a sliding fit with the stud for otherwise unconstrained reception of the stud is preferred for recyling of a single piston or cylinder, it will be understood that the free flight preventing member acting as a braking link between the stud and the interceptor jaws may be an item lightly, but detachably fastened by a suitable quick disconnecting coupling to the stud so that after each shot the cylindrical link may be disconnected and recycled for subsequent reuse unless there has been an overpenetration and resultant deformation of the link.

In order to render the tool inoperative in the event the tool operator fails to insert the safety braking cylinder, there is provided a propellent fluid bypass means between the propellent cartridge chamber and the driving-braking safety cylinder. This is done by taking advantage of the fact that the stud is in effect a subcaliber projectile and by providing bypass openings between the cartridge chamber at the breech of the barrel and the clearance space between the safety cylinder and the wall of the barrel bore ahead of the breech. This is most advantageously provided by bifurcation or otherwise forming escape ports extending between the subcaliber bore of the breech plug member (FIGURES 1 and 23) and the anterior edge face of the plug in communication with the coaxial clearance space between the stud and bore wall at a place just ahead of the plug edge face. Any other equivalence of the same arrangement can be provided in the breech of the barrel where the cartridge chamber is integral with the barrel. A plurality of such bypass ports or slots are preferred for the freest bypass from the front of the cartridge chamber which is of a length in excess of the propellent cartridge length in order to provide a minimum combustion chamber. If such a bypass were not provided, it is possible that the stud may block the mouth of the combustion chamber; and on firing of the cartridge the stud may be accelerated to a penetrating velocity. Any bypass port arrangement may be provided so long as there is communication between the combustion chamber and the rear part of the barrel bore adjacent the mouth of the combustion chamber. These ports, in the absence of a flight braking cylinder, permit the propelling gas to flow along the sides of the fastener in the opening between it and the bore without imparting any substantial velocity to the fastener. Thus, the special breech plug with a split or vented front end bleeds off the propellent gases and makes hazardous driving of the fastener impossible even through the tool operator forgets to insert the expendable safety cylinder or piston, since all the effective fastener velocity ordinarily is developed in about the first inch of travel of the driving piston and fastener.

The breech plug is a modification of the type shown in co-pending applications Serial Nos. 244,845 (now U.S. Patent No. 2,869,127, issued January 20, 1959), 355,034 (now U.S. Patent No. 2,945,236, granted July 19, 1960), and 551,417, filed September 1, 1951, May 14, 1953, and December 6, 1955, respectively, and consists of a propellent cartridge chambering sleeve having a posterior laterally outwardly extending flange ordinarily knurled to facilitate manual handling. The sleeve is an extension fitting snugly in the breech of the barrel and the side port modification at the front end insures that the fastening stud, in the absence of the braking cylinder, will not come into obturating driving engagement with the plug.

In order to extend the useful life of the driving-braking safety piston, there is provided intermediate the ends of the barrel a restricted portion preferably adjacent the breech leaving an oversized bore at the muzzle long enough to accommodate the longest fastener and driving piston assembly between the muzzle and the restriction. This restriction forms a sizing throat for the cylinder in order to iron out any swelling or bulging which will eventually occur adjacent the base of the end recesses because of the pounding occurring during the driving operation and tending to diametrically swell the cylinder. Although such a sizing throat is not necessary, it will be appreciated that excessive swelling will eventually bind the cylinder in the barrel bore making impossible or difficult its normal removal and its normal reloading with subsequent fasteners.

While the piston diameter and socket depth is determined by the size of fastener and the clearance needed to obtain an adequate thickness and length of side wall at the end sockets, the overall length of piston is determined by the need to have enough plastic material to dissipate the maximum power, which must be expended when it is not absorbed adequately by the workpiece. After a given diameter of fastener and a maximum explosive propellant charge are settled upon, the necessary piston and barrel bore diameter and piston length may be readily selected. These will vary for different diameters of fasteners and for different driving powder loads beyond any selected range. The length of the fastener apparently causes no substantial variation since the velocity of penetration varies inversely with variations in lengths of a given diametral size of fastener leaving the momentum and the total energy to be dissipated the same as determined by the powder load. A heavier powder load will produce more deformation in the piston while a lighter load produces less deformation.

The unimpaled length of the fastener or stud, which remains exposed on the surface of the workpiece after penetration, must exceed the depth of the socket recess by a clearance length sufficient to clear the jaws of the stopping jaw with a normally driven stud of approximately proper penetration taking into account and providing for expected variation in penetration including a reasonably slight overpenetration by a tolerance of some small fraction of an inch between the leading edge of the piston and the entry side of jaws such as ⅛ of an inch.

Thus, with a minimum permissible socket depth of about ¼ of an inch or slightly more and a jaw thickness of about 0.150 of an inch, the fasteners have a normally unimpaled usually threaded end of a length of at least about ½ of an inch or slightly more, but in any event a length for protruding from the workpiece surface in excess of the depth of the socket. Although it is desirable that the socket depth be standardized at the minimum permissible to take care of fasteners having a short as well as a long unimpaled rear end portion, whether wholly threaded or not, it will be understood that for longer ends the socket may be deeper up to nearly the midpoint of a reversible piston, or up to nearly the length of an irreversible one of adequate length.

The front end of the barrel bore is enlarged to insure that the piston upon completion of driving will readily drop out of the bore.

The tapered front end of the barrel makes a sort of pilot fitting with the split recess of the jaws thereby toggling the jaws into die closing relationship as the jaws are pushed against the work which also gives a thrust aiding the swinging action resulting in closing the die.

The stud driving piston or cylinder according to a still further embodiment may be deformable except for a tough hard portion located at either one end or at the middle portion, if it is a reversible plug, so as to be impassable through the die jaws of the abutment member except for the forepart. As a still further variation, the piston may be dead soft at the socketed end and gradually become tougher and harder away from this end so as to obtain a sharper and shorter deceleration. Such a hardness will enable a shortening of the piston where desired and provide an initial deceleration with a final sudden stop at maximum overpenetration at the highest loads.

Thus, it will be apparent that the device of this invention accomplishes its purposes by a metal shaping operation involving cladding of a metal core member with a sheathing member by driving an assembly of the first member carried in a recess of the second through an extrusion die. The operation also involves ironing of a rod by a sizing pass through such a die. In still another aspect, the operation involves the coupling of the two members by passage through an extrusion die.

It is to be understood that the invention herein involved may take various forms in order to be applicable to any one of the fastener driving tools of the various types known and contemplated and is not to be limited to the structural details specific to any particular tool. For the sake of providing a description of a specific embodiment, this invention is described herein with reference to the tool shown in FIGURE 1 and is there shown designed especially for attachment to that type of explosively actuated tool which is disclosed in co-pending application Serial No. 551,417, filed December 6, 1955. This tool is characterized by a reciprocating relationship between the barrel and housing and by the presence of various safety features including a control which prevents firing at an angle to the workpiece which might lead to ricocheting. For exact details of the tool construction, apart from the specific details of this invention, reference should be made to the aforementioned patent application.

Figures 1, 2:
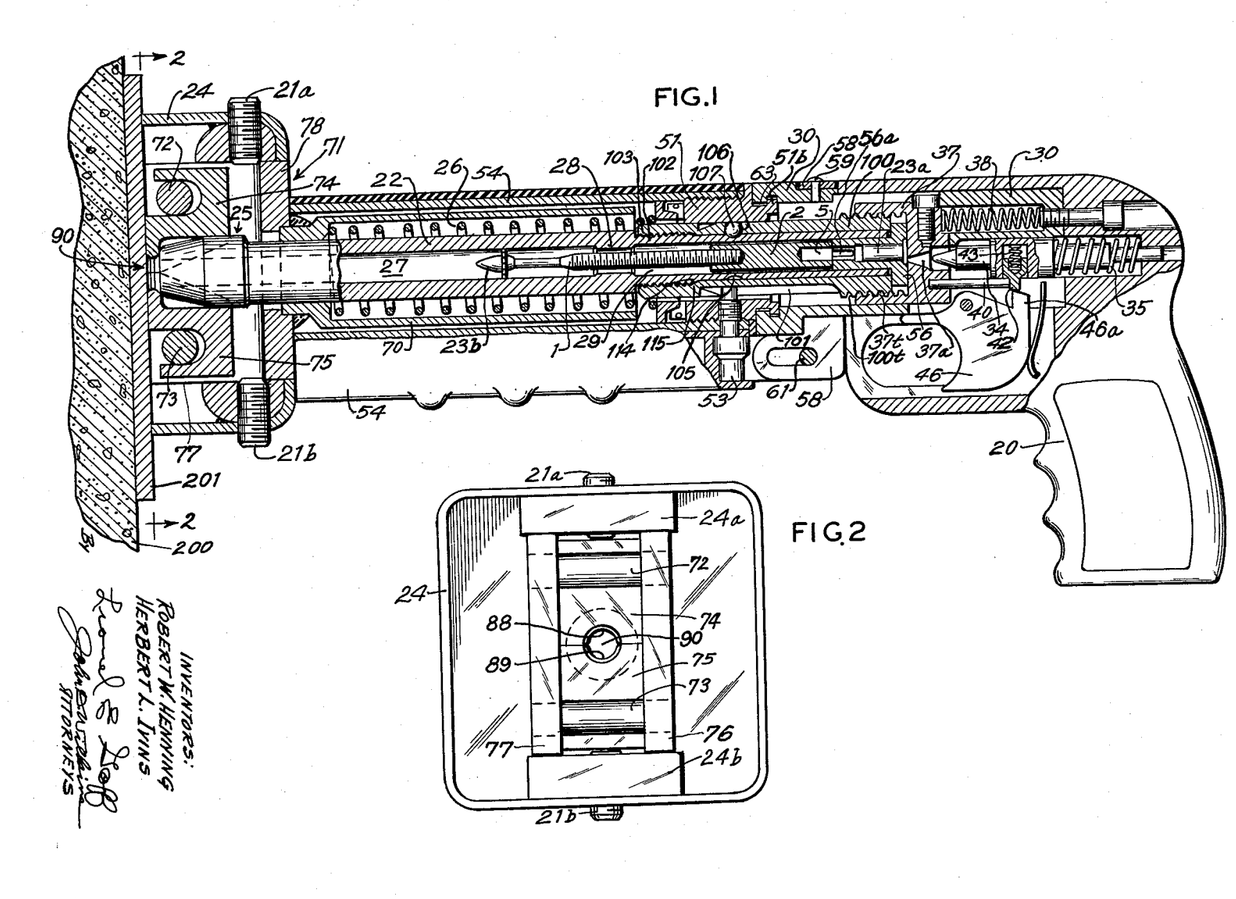
FIG. 1 is a longitudinal cross sectional view showing an explosive actuated fastener driving tool with the safety fixture of this invention mounted thereon and showing the tool barrel loaded to include a fastener and the muzzle thrust against the surface of a workpiece ready for driving the included fastener.
FIG. 2 is a front view taken on line 2—2 of FIGURE 1.

The tool of FIGURE 1 consists of a pistol grip or other suitable handle 20, a rear housing 30 to which the handle is made fast, a front housing tube 54 carried on the outer tube collar 51 in detachable engagement with the rear housing, a barrel receiver or carrier collar 100 engageable at its interrupted male threads 100t with the interrupted female threads 37t of a barrel breech block 37, which is slidably carried in the rear housing 30 for coaction with a firing pin 34, and an interchangeable barrel assembly or fixture consisting of the barrel 22 and an optional shield 24 fixedly carried with respect to yoke tube 70 with a forward bias with respect to the barrel by reason of the thrust of barrel compression spring 26.

The tool is such as to permit it to be opened intermediate the ends by a hinge action at the transverse hinge pin 61 about which there is a limited longitudinal motion permitted by the slots in the pair of ears which form the ends of the mounting ring 58 in which rear housing 30 may turn back and forth to a limited extent as permitted by the fixed pin 59 of the ring acting in an arcuate slot of housing 30. This sliding and turning action adapts spaced lugs 63 on the front end of the rear housing 30 to interengage with the mating circumferentially spaced lugs 51b of the tube collar 51 to form a bayonet type of connection between the front housing tube 54 and the rear housing 30, including handle 20, while at the same time permitting threads 100t and 37t to interengage in the same way. This locks the tool about the cartridge chambering breech plug 56 for readying the tool for setting off the explosive cartridge 23a when firing pin 34 is released by the action of the sear 46a of trigger 46, when it is pulled, thereby pushing in the spring loaded pawl 42 until it clears the cocking rod 40. This enables the striking point of the pin to shoot forward and enter the orifice 37a under the impetus of the firing pin spring 35 when the tool has been thrust against the work as shown to move the entire housing forwardly with respect to the block 37 and its rod 40. The latter thereafter interengages with the pawl 42 so as to again bring it into releasable alignment with trigger sear 46a while at the same time cocking the firing pin when the tool is once more thrust against the workpiece.

In order to adapt the tool for interchangeability of barrels of different type and/or the different calibers needed for the various sizes of fasteners or studs to be driven, the barrel portion of the tool is made of two parts, namely the barrel collar or receiver 100 and the interchangeable barrel 22. This barrel, like a regular permanent barrel, is of full length without the intermediate joints of a longitudinally segmented barrel, but at the rear end it is of reduced outer diameter so as to be receivable in barrel collar 100. This portion of reduced diameter is preferably tapered at 114 so as to adapt the barrel to fit tightly with the corresponding collar taper 115 and substantially resist any tendency of the barrel to work loose. Receiver 100 is mounted slidably in collar 51 so as to permit limited relative longitudinal reciprocating movement between the front housing or outer tube collar 51 and receiver 100 as permitted by the extension of stop pin 53 reciprocatably in the longitudinal slot 101 of barrel receiver or collar 100 when the tool is unpressed and pressed against the work. Such relative movement occurs when the tool is thrust against the work surface of part 201 causing the coupled two-part housing and collar 51 to move as a unit with respect to the barrel receiver or collar 100 is assembly with the barrel 22 in stationary abutment with respect to the work surface. Movement may also occur when the tool is not aligned squarely to the workpiece in which event the barrel 22 and collar 100 in assembly move forward with respect to the housing for the particular kind of tool here disclosed and prevent operation. Barrel 22 is constructed so as to be readily secured within collar 100 by any suitable quick-connect means such as and preferably by male screw threads 102 engaging with the corresponding female threads 103 of receiver 100. To facilitate installation and removal of the barrel, it has a number of oppositely disposed depressions 104 in the bore at the muzzle forming a socket by which it may be engaged by a socket head 401 of a suitable wrench such as 400 (FIGURE 21) and turned.

At this reduced rear end, barrel 22 has a circumferential groove 105 alignable axially with a radial hole 106 in collar 100. This hole serves as a seat for a ball 107 movably mounted in hole 106, but retained therein by the inwardly projecting rims at the ends of the hole which do wholly contain but also permit ball 107 to protrude to a limited extent either from the inner end of hole 106 into groove 105 or to protrude from the outer end of hole 106. The relationship of the ball diameter and wall thickness of collar 100 is such that unless ball 107 extends into groove 105, it will be forced to protrude from the outer end of hole 106 in which position the extending ball interferes with the front face of housing collar 51 to prevent placement of the tool into the ready-to-fire position unless the barrel is placed properly in the collar 100 in which position ball 107 forms no interference with collar 51.

The slotted hinge pin and bayonet type coupling arrangement permits the rear housing and its assembly of parts to be separable to a limited extent as a single unit from the front housing and its assembled members. This unit includes the breech block 37, cocking pin 40 carried on the breech block, the spring biased firing pin 34, its biasing spring 35, the firing pin pawl 42, the pawl spring 43, the trigger 46 and also the breech block return spring 38.

The tool is shown in FIGURE 1 loaded with the fastener or stud 1, piston 2 and the propellant cartridge 23a. The stud as better shown in FIGURE 6 has an enlarged threaded rear end 3 and a reduced penetrating shank 4.

Figures 6, 20:
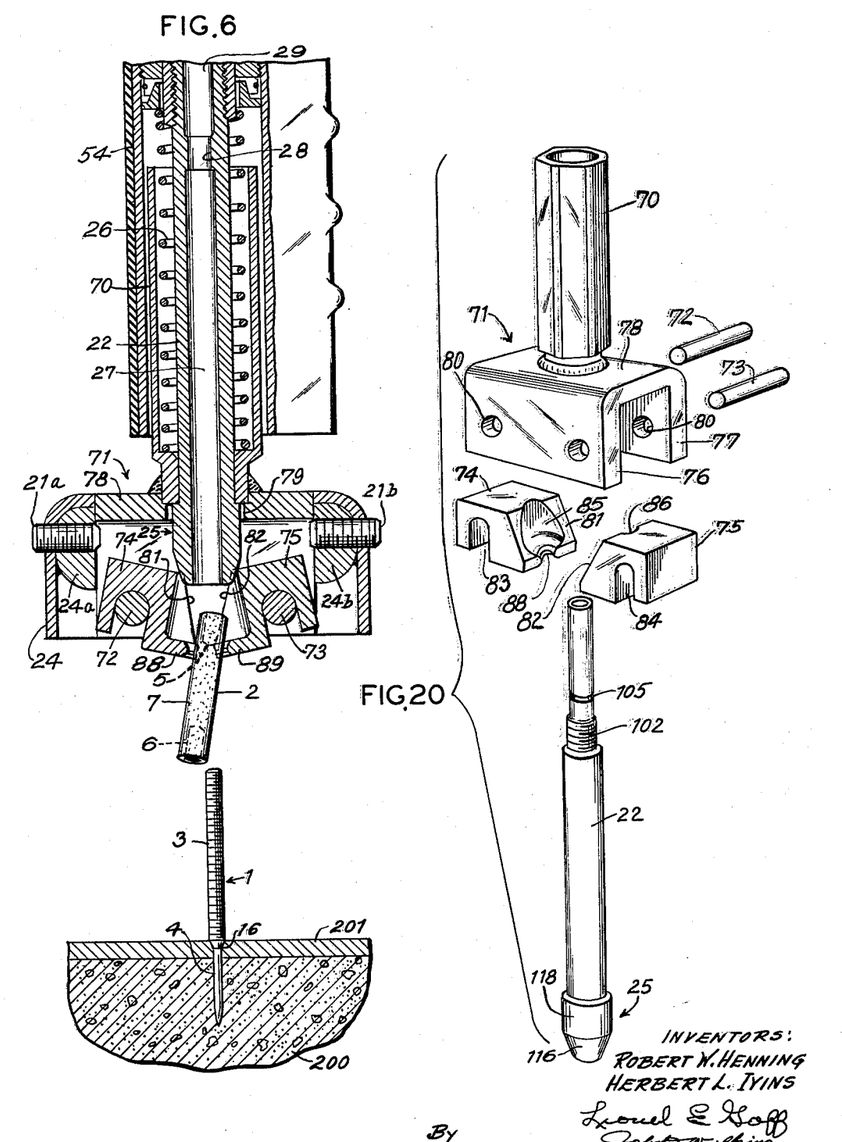
FIG. 6 is a fragmentary view corresponding to FIGURE 5, but with the tool pulled away from a properly driven fastener and showing the braking cylinder in perspective removed from the barrel bore preparatory to reuse.
FIG. 20 is an exploded view in perspective showing the basic parts of a safety fixture including a barrel adapted for mounting the fixture readily and interchangeably on fastener driving tools.

Fixed on the front of a yoke tube 70 for mounting at the muzzle of the barrel and at the front of the tool is a yoke member 71 having bight portion 78 apertured at 79 for passage of the barrel and also having forwardly extending legs 76 and 77 with holes 80 in which there are driven the jaw supporting pins 72 and 73 for mounting the jaws 74 and 75 between the legs of the yoke (FIGURE 20). Optionally mounted on the yoke is a shield 24 having fixed thereon shield mounting blocks 24a and 24b for threadedly receiving shield mounting studs 21a and 21b. The yoke is for carrying a pair of articulating jaws 74 and 75 of a segmented die adjacent the front end 117 of the muzzle of the tool barrel. These jaws are in effect levers mounted to rock on pins 72 and 73, respectively.

Jaw segment 74 is slotted at 83 to receive the pin 72 in pivotal relationship with limited sliding. Similarly, jaw segment 75 is slotted at 84 for the pin 73. The jaws carry the die halves including peripheral portions 88 and 89, respectively, and these are articulatable into die closing and opening position by virtue of the pivotal action of the jaws on the pins 72 and 73 to form and unform the die orifice 90. Each jaw 74 and 75 is also shaped back of the orifice to have a jaw recess such as recess 85 and recess 86, respectively, for coaction with the muzzle enlargement 25 of the barrel 22 and particularly with the tapered jaw pilot and jaw clearance portion 116 disposed between the front end 117 of the barrel and the lateral cylindrical cam surface 118 of the enlargement adapted for entry into the jaw recesses 85 and 86. The side wall 118 of the enlargement 25 has a camming action locking the peripheral halves 88 and 89 together to form the die orifice 90 when the tool is in the ready-to-fire position with the orifice peripheral portions 88 and 89 of the jaws disposed between the surface of the workpiece and the front end 117 of the barrel.

Figure 5:
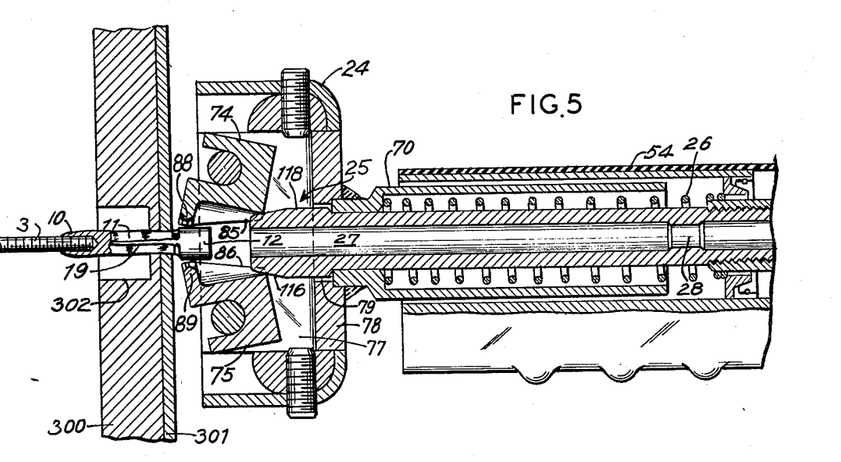
FIG. 5 is a fragmentary view of the tool parts of FIGURE 4 showing the manner of extricating the safety fixture of the tool from an overdriven fastener in preparation for subsequent driving operations.

Jaws 74 and 75 have cut-away parts 81 and 82, respectively, for permitting the jaws to rock open more widely in the direction reverse to closing when the enlargement 25 is withdrawn from the jaws in order to enable the jaw halves 88 and 89 to open up more widely for better discharging the driving piston 2 from the barrel front overbore 27 whether the piston be deformed as in FIGURE 5 or undeformed as in FIGURE 6.

The driving piston 2 is of cylindrical shape to form a slidable fit in the barrel with substantial obturation at least in the rear bore 29 adjacent the breech plug 56. The piston is plated or otherwise coated with a suitable material such as the copper plating 7 to better maintain the safety characteristics constant. For holding a fastener, one end of the piston is recessed at 5 and, for reversibility, the other is similarly recessed at 6.

For motivating the piston 2, barrel 22 carries at the breech a special powder charge carrying breech plug 56, the front end of which is slotted at 56a for porting the bore of the plug to thereby prevent stud driving in the event a tool operator has inadvertently omitted to insert piston 2. The gas passing through slots 56a in such event will bypass the enlarged rear end 3 of the stud 1 in the tool barrel even if the stud is aligned with the bore of the plug.

Figure 7:
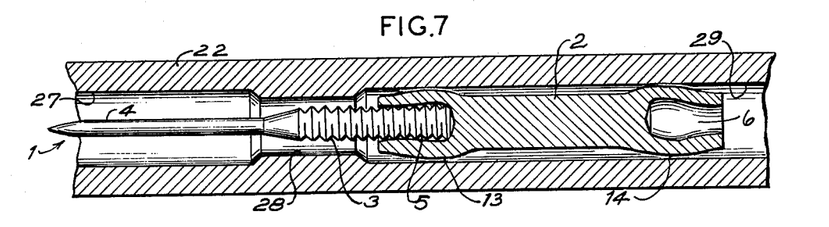
FIG. 7 is a fragmentary cross sectional view of only a portion of the barrel of FIGURE 1 showing loaded therein a fastener and a many times used braking cylinder adjacent the breech of the barrel.
Figure 8:
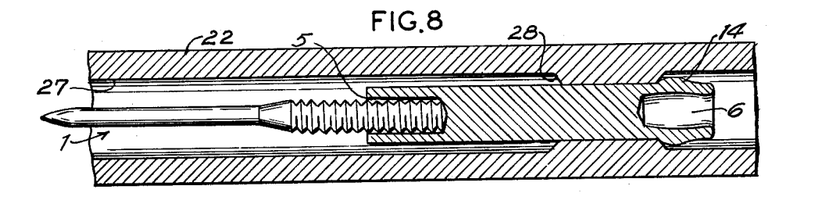
FIG. 8 is similar to FIGURE 7, but shows the cylinder subsequently passing through the sizing throat upon actuation of the tool.

This plug is mounted in the rear end part 29 of the barrel bore which part is of a diameter suitable for also receiving the piston in driving relationship under the impact force of the explosive charge of cartridge 23a carried in plug 56. The front part 27 of the barrel bore is over bored to the largest diameter to offer the piston no resistance to removal from the tool. Between the driving rear bore 29 and the front overbore 27 the barrel has a restriction 28 forming the piston sizing throat for acting on the piston as is hereinafter explained in connection with FIGURES 7 and 8. Each time a stud is driven, it is the piston 2 which transmits the explosive driving force. Under continued usage a piston will in time be bulged as shown at 13 and 14 because of the pounding action. Without the sizing throat 28, this bulging accumulates and in time may become so large as to prevent reception of the piston in the barrel bore 29. This bulging is resisted by the ironing action occurring at the sizing throat 28 as shown in FIGURE 8, where the piston is shown in transit through the throat with its forepart brought back down to an acceptable diameter thereby extending the continued usage of the piston.

One fastener suitable for use in connection with this invention consists of the enlarged rear end portion 3 and the reduced point 4 for normal penetration into any workpiece such as one consisting of a supporting material 200 and a supported member 201. Between portions 3 and 4, fastener 1 has a suitable abutting shoulder or taper 16 to define a more positive stop to penetration. The trailing end of the enlarged rear 3 is free from burrs or any sharp edges to facilitate dependable reception into one of the recesses 5 or 6 of the piston 2; and these recesses in turn are similarly free from sharp edges for the same purpose. The tip of penetrating point 4 is provided with a nose cone 23b having any suitable flexible and perforated flange means engaging yieldably with the barrel bore at 27, 28, and 29 to put the fastener 1 in desired centering and guiding relationship in the barrel bore as shown in FIGURE 1 without giving it any substantial penetrating velocity in the absence of the piston 2. Preferably the cone is of polyethylene or the equivalent which passes through the die jaws elastically without any adverse effect on their operation.

In operation, the tool is first loaded with the fastener 1 such as one having a nose cone 23b after which the piston 2 is pushed into the breech end of the barrel bore 29 with one of the recesses 6 engaging with the end 3 of the fastener. Bore 29 is finally loaded with the slotted plug 56 bearing a suitable propelling charge in the form of a rimfire cartridge 23a adapted to be set off by the firing pin 34 acting through breech block orifice 37a. With the tool thus loaded and after the parts of the tool are locked up, the tool is thrust toward the work as shown in FIGURE 2 with the front end shown in FIGURE 1 in abutment with the workpiece consisting of objects 200 and 201, for example, whereat the skirt of the safety shield 24 surrounds the impact area of the workpieces. In this position, the legs 76 and 77 of the yoke 71 and the jaws 74 and 75 are put into abutment with the surface of the workpieces. The die peripheral halves 88 and 89 are clamped between that surface and the front end 117 of the barrel 22 to form the piston intercepting orifice 90. Thus emplaced, the tool is in the ready-to-fire position at which the cam surface 118 of the barrel enlargement 25 locks the jaws in a closed piston stopping position and at which the sear 46a of trigger 46 is aligned with pawl 42 because of the action of control rod 40. Here it is only necessary to pull the trigger while maintaining thrust on the tool to drive the stud into the workpiece as shown in FIGURE 3.

Where the tool also is of the safety type responsive to the angle of the barrel to the work, this feature of angle fire control is preserved. The shield 24 can also be utilized for added safety, but is mountable on the yoke 71 in such a way that it may be removed, if desirable, to get the muzzle of the tool into a more closely quartered work installation. Absence of the shield does not impair the safety function of the device of this invention.

Figure 3:
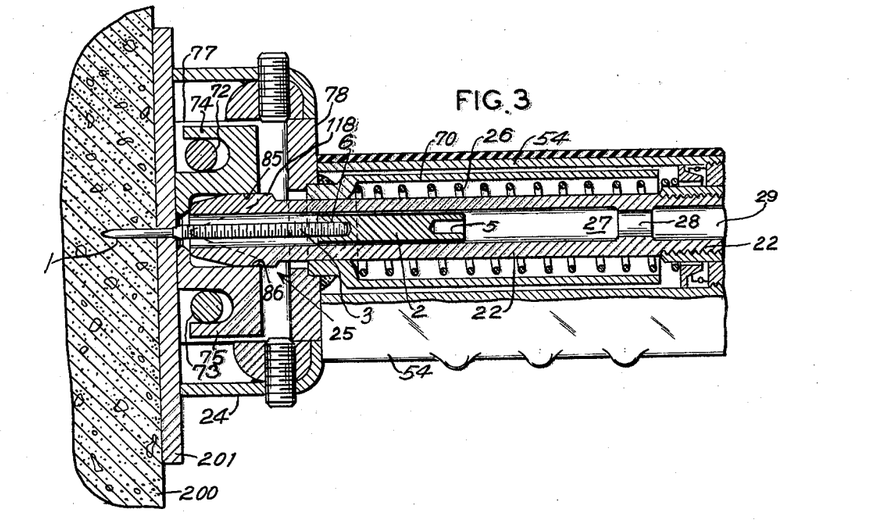
FIG. 3 is a fragmentary view showing the front part of the tool of FIGURE 1 in longitudinal cross section and especially the safety fixture and braking cylinder at the moment of completion of the driving operation whereon the fastener has been driven properly.

Assuming the workpieces 200 and 201 offer normal resistance to penetration, after the fastener is driven as shown in FIGURE 3, in order to ready the tool for the next operation, it is only necessary to withdraw the tool from the workpiece as shown in FIGURE 6 leaving the fastener 1 properly impaled thereon and permitting the jaws 74 and 75 to rock open as the barrel enlargement 25 is withdrawn from the die recesses 85 and 86 under the action of the barrel and shield compression spring 26. This permits the piston 2 to drop out of the barrel overbore 27 for reuse.

Figure 4:
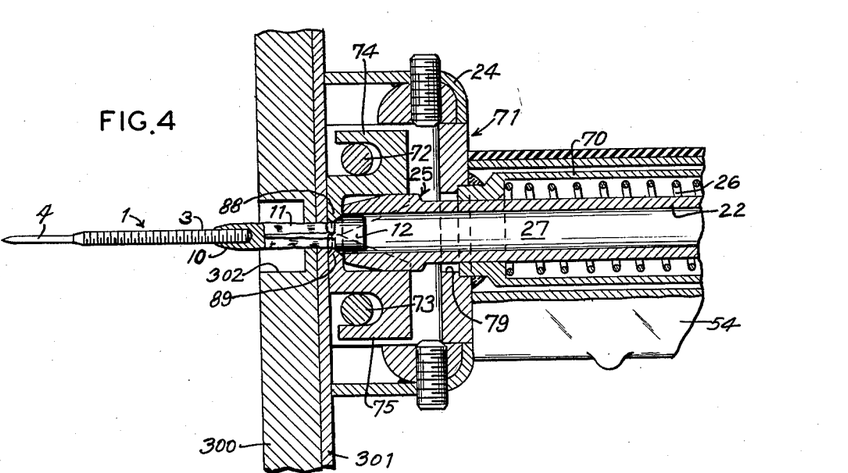
FIG. 4 is a fragmentary view similar to FIGURE 3, but showing the driving operation with an overdriven fastener.

If, however, the workpiece is abnormal as, for example, where it consists of pieces 300 and 301 having an area 302 of unexpected ease of penetration, the piston will pass through the die opening 90 together with the rear end 3 of the fastener received in the orifice 6 of the piston. The resultant deforming action of the peripheral portions 88 and 89 of the intercepting orifice 90 closes the leading recessed end 6 of the piston to form a grip 10 with the end 3 of the fastener, dissipates the excess energy in the deformation occurring in the ironed portion 11 of the piston 2 and finally and positively stops the fastener 1 by interference between the jaws 74 and 75 and the undeformed heel 12 which remains on piston 2 and cannot pass the closed jaws.

Figures 9, 23:
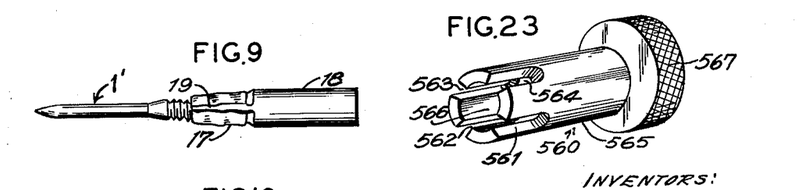
FIGS. 9 and 10 show a given size of fastener and its relationship with the braking cylinder after overpenetration each driven at different driving power levels, namely a low level and a high level, respectively.
FIG. 23 is a perspective view showing another embodiment of the breech plug, one embodiment of which is shown in FIGURE 1.
Figure 10:
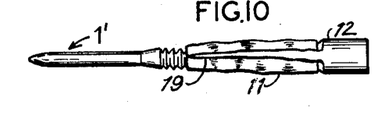
Figure 11:
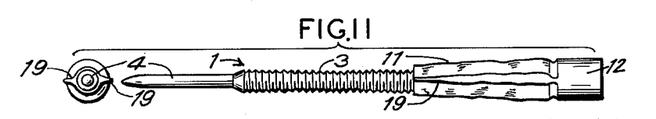
FIG. 11 corresponds to FIGURES 9 and 10, but shows another size of fastener driven at the same power level as that used for the fastener and cylinder combination of FIGURE 10.

Three captivated units are shown in FIGURES 9, 10, and 11. A relatively short threaded fastener 1' is shown in the units of FIGURES 9 and 10 while a long threaded fastener 1, comparable to that shown in FIGURES 1, 3–6, is shown in FIGURE 11. Another difference between the units is that where those of FIGURES 10 and 11, like that of FIGURES 4 and 5, were driven to overpenetration at a very high load in powder cartridge 23a which is indicated by the longer ironed deformation 11, the unit of FIGURE 9 was driven at a lower load and has a correspondingly shorter ironed deformation 17 and a longer heel 18. Regardless of the difference in size of fasteners and loads, the heel portions 12 or 18 remaining on the piston are adequate for constraining all the excessively overpenetrated units in the safety jaws, thus stopping trouble before it has a chance to start. Due to the clearance between the jaws 74 and 75 at the orifice perimeter portions 88 and 89 and the edge bevels 94 and 95 (FIGURE 19) at the line of separation there are left oppositely disposed flash portions 19 in alternation with the ironed portion 11 of the piston which has intercepted a fastener under conditions of excessive overpenetration.

In this position, piston 2 has performed its safety function by gripping the run-away fastener at 10 and forming a link over the deformed length 11 between gripped fastener and the piston head 12 remaining undeformed and constrained by the closed jaws 74 and 75.

The act of extrication of the tool from the stopped fastener-piston unit is shown in FIGURE 5 where the barrel enlargement 25 is drawn back toward bight 78 into its aperture 79 against the front end of tube 70 thus withdrawing the cam surface 118 out from the jaw recesses 85 and 86 and bringing the tapered muzzle portion 116 opposite jaw clearances 81 and 82. This allows jaws 74 and 75 to rock back on pins 72 and 73, as in FIGURE 6, thereby separating the die orifice sectors 88 and 89 to break up the piston intercepting orifice 90 and allow the stopped and deformation piston including its undeformed constraining heel portion 12 to clear the jaws and be discarded for a new piston. A sharp rap on the yoke 71 facilitates unlocking of the captivated unit and the jaws.

Figure 12:
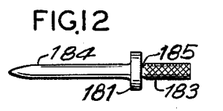
FIG. 12 shows another embodiment of fastener suitable for driving according to this invention.
Figure 13:
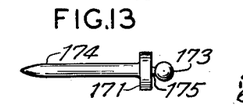
FIG. 13 shows still another embodiment of such a fastener.

While one type of fastener and driving piston has been described, it will be understood that various changes and modifications therein can be made. One such modification is shown in FIGURE 12 having a nail head 181, a penetrating point 184 and a knurled rear end 183 connected to head 181 by a reduced portion 185 adapting the knurled gripping end 183 to be knocked off by a sharp side blow after driving to leave only the head 181 protruding from the work. In FIGURE 13, there is shown another fastener having a similar nail head 171 and penetrating point 174, but having a modified rear end portion 173 of the collar button type which may be readily severed from the head 171 at the narrow neck 175 which otherwise forms an adequate connection. The recessed ends of suitable pistons for these embodiments are correspondingly modified in length, diameter and/or internal shape of the recess.

Figure 14:
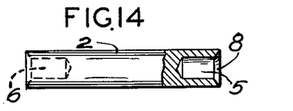
FIG. 14 is a longitudinal view partly in cross section and partly in elevation showing another type of braking cylinder according to the invention.
Figure 15:
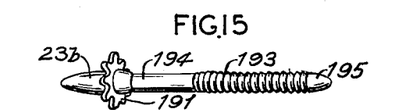
FIG. 15 is a perspective view of another embodiment of fastener with a nose cone for combination with the braking cylinder according to this invention.

One modification of the piston is shown in FIGURE 14, wherein the recesses 5 and 6 have a flared portion 8 at the mouth to better guide the trailing end of the fastener into the recesses. Such a flare may also give the unit a more gradual inception of deceleration by providing less material for deformation initially. Still another fastener is shown in FIGURE 15 where the penetrating point 194 is of substantially the same diameter as the threaded rear end 193. As in the other embodiments, a nose cone 23b with a flexible serrated flange 191 is provided on a point 194. The trailing end of this fastener, however, is rounded to form a rounded point or nose 195 to better guide the end into the recesses of the piston. Such a pointed end or nose may be provided on any one of the foregoing embodiments and may be used together with the flared recess of the piston of the type shown in FIGURE 14. In any event, neither the flare 8 of the piston of FIGURE 14, nor the guiding end 195 of the fastener of FIGURE 15 should be of such excessive length as to interfere with the desired gripping action between piston and fastener.

Figure 16:
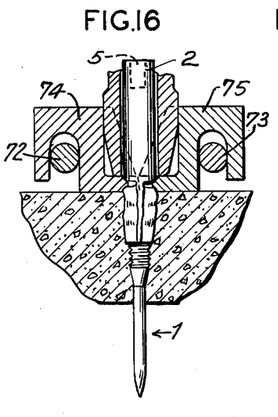
FIG. 16 is a fragmentary view in cross section showing a heavily overdriven fastener.
Figure 17:
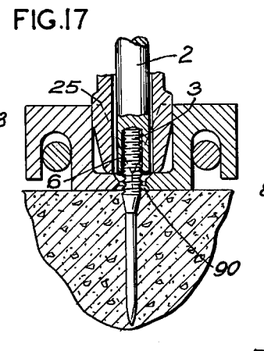
FIG. 17 is a fragmentary side view in cross section showing the same fastener driven to a slight overpenetration, but otherwise acceptably driven.
Figure 18:
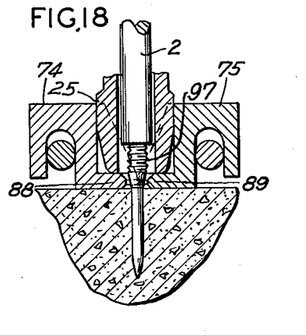
FIG. 18 is a fragmentary side view in cross section showing the same fastener slightly underdriven, but otherwise acceptably driven.
Figures 19, 21, 22:
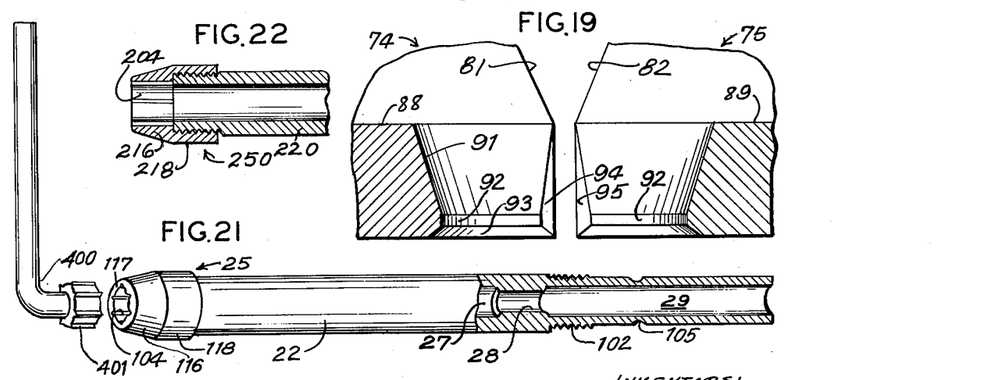
FIG. 19 is an enlarged fragmentary view in cross section showing details of the jaws of the device of this invention.
FIG. 21 is a perspective view of the barrel shown partially in cross section together with a wrench for assembling and disassembling the safety fixture in the type of tool shown in FIGURE 1.
FIG. 22 is a fragmentary cross sectional view showing a modification of the front part of another embodiment of the barrel.

The desired structural relationships between and among the parts of the die orifice 90 and the recessed parts 5 and 6 of the piston 2 and the trailing end 3 of the fastener are illustrated in FIGURES 16–19. The relative length of the received end of the fastener 1 and the depth of the piston recess is such as to leave a minimum protruding part 97 (FIGURE 18) of the normally unimpaled end 3 of the fastener. This, for all practical purposes, provides the preferred and almost necessary tolerances or clearances so that the tool will not be excessively sensitive, but will allow a permissible amount of overpenetration, as well as underpenetration (FIGURE 18). Due to this clearance, a slight overpenetration as shown in FIGURE 17 can be accommodated by the tool without causing premature deformation of the piston 2. When, however, penetration becomes excessive, gripping deformation occurs as shown in FIGURE 16 in comparative relationship with the situations shown in FIGURES 17 and 18. The amount of fastener protrusion 97 needed is determined among other things by the thickness of the peripheral portions 88 and 89 which form the perimeter of the intercepting die orifice 90 as shown in FIGURE 19.

Although various die orifice profiles may be utilized and the thickness of the die parts may be varied, one die throat profile found very suitable is that of FIGURE 19 where the orifice 90 consists of a relatively long and steep die entry portion 91 defined by an included angle of about 34°, a short cylindrical die throat 92 and a relatively short die outlet portion 93 flared at about an included angle of 90°. To increase the life of the die the side edges 94 and 95 at the parting line are also beveled. One overall thickness of the die orifice periphery found suitable is of the order of about 0.15 of an inch.

As pointed out hereinbefore, the piston intercepting parts of this invention may be conveniently assembled with a barrel 22 as a readily installed and replaceable fixture the parts of which are shown in FIGURE 20.

Various of the aforementioned structural features of the barrel 22 are shown in FIGURE 21 together with a fixture installing wrench 400 having a wrench socket head 401 for engagement with the socket end 104 of the barrel for readily installing or removing the entire fixture. This barrel structure can be modified in various ways. For example, as shown in FIGURE 22, the front end enlargement may consist of a detachable piece 250 having a tapered end portion 216 and the camming side wall 218 together with a wrench socket interior 204. This piece is adapted for threaded engagement with a barrel 220 having a threaded muzzle.

Figure 25:
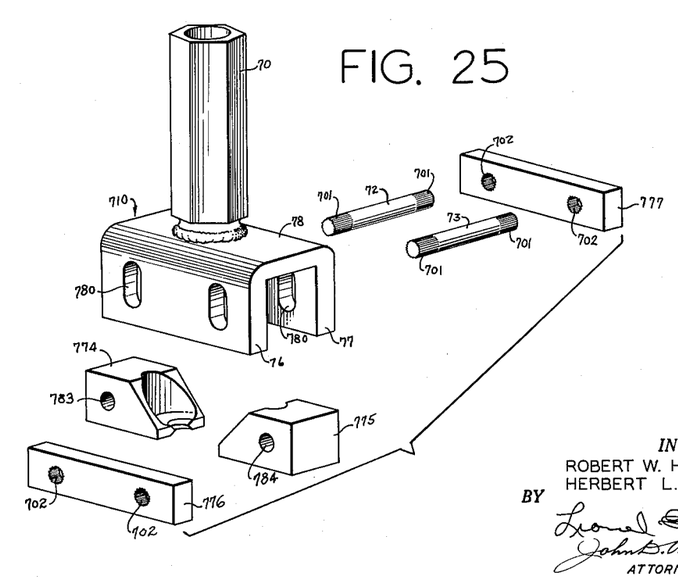
FIG. 25 is an exploded view in perspective showing another embodiment of the safety yoke and its jaws together with their mounting pins.

FIGURE 25 shows in detail another form of the safety fixture also including the yoke tube 70, but having mounted thereon a yoke 71, the legs 76 and 77 of which are connected by the bight plate 78 but which are each axially slotted adjacent each end at 780 in lieu of slots in the jaws. In this embodiment, the jaws 774 and 775 are provided with round holes 783 and 784, respectively, instead of slots for reception of the pins 72 and 73. The ends of these pins are splined at 701 for fitting in the correspondingly splined holes 702 of the side bars 776 and 777 mounted on the outside of the legs 76 and 77, respectively. Each pin passes through one of the jaws and both of the slotted legs. As noted hereinbefore, according to this arrangement the rotatable jaws 774 and 775 may slide forwardly and rearwardly in unison together with the side bars 776 and 777 to the extent limited by the four slots 780. It will be understood that instead of splines, the ends of the pins may be square in cross section so as to slide with guidance in the slots and at the same time to provide fixation in the holes of the side bars, which link the pins together at the ends. In any event, this forms a frame structure mounted in the yoke and carrying in turn the jaws.

The breech end of the barrel is adapted to take the ported breech plug 56. It will be understood that this plug may take various forms. The details of one such plug 560 are shown in FIGURE 23 wherein the plug consists of an enlarged flanged rear portion 567 knurled in order to facilitate manual loading and unloading of the tool and also an extension 565 having a bore 566 forming a chamber for receiving an explosive power cartridge such as 23a and also a portion of a combustion chamber, the other part of which includes either piston recess 5 or 6 whichever is facing the open end of the plug extension 565. This end is ported both forwardly and laterally by any suitable number of slots such as 561, 562, 563, and 564.

While the foregoing is presently believed to be a preferred embodiment, it will be understood that still other changes and modifications may be made by those skilled in the art without departing from the spirit and scope of this invention as set forth in the appended claims.

What is claimed is:

1. In a stud driving tool, a barrel having a bore for passage of said stud at high velocity for projection therefrom into a workpiece with a predetermined penetration under the impetus of sudden expansion of a gas within said bore, and deformable means slidably carried as a workable material in said bore, and adapted to be acted on at one end by said gas for driving said means and stud and being recessed at the opposite end to receive an operative portion of said stud in telescoped relationship in said recessed end, and material working means secured on said tool at the muzzle of said barrel for deforming said deformable means into stud retaining engagement with said stud from the beginning of excessive projection of said stud beyond said predetermined penetration, while simultaneously gradually decelerating both said deformed deformable means and the retained stud to limit the distance to which the stud may be projected beyond said predetermined penetration.

2. In a stud driving tool, a barrel having a bore for passage of said stud at high velocity for projection therefrom into a workpiece normally not beyond a predetermined penetration under the impetus of sudden fluid expansion with said bore, an elongated body of plastically workable material slidably carried between said stud and expanding fluid in said bore and adapted to be acted on at one end by said fluid for driving said body and stud ahead of said body, said body being recessed at the other end to provide walls for sheathing a rear end portion of said stud, and material working means secured on said tool at the muzzle end of said barrel and deflectable inwardly for normally retaining said body undeformed in the bore and in the event of excessive projection of said stud beyond said predetermined penetration progressively and permanently deforming said body at least at said recess into stud retaining engagement, whereby said stud and body are gradually decelerated to stop in captive relationship with respect to said tool.

3. A safety assembly for a tool of the type which projects subcaliber studs through a tool barrel bore of a given caliber into the surface of a workpiece with a predetermined penetration under the impetus of explosive expansion of a gas within said bore comprising an elongated cylinder of substantialy said caliber and of workable material slidably engaged in said barrel bore to be acted on at one end by said gas and recessed at the opposite end to accommodate the rear end of said subcaliber stud in telescoped relationship, and an extrusion die releasably secured on the muzzle of said barrel for normally retaining said cylinder undeformed in said bore while passing said stud, and for engaging with said projected cylinder and gradually deforming said cylinder inwardly at least at said recess and substantially about said rear end into stud retaining engagement to prevent complete departure of the projected cylinder and stud from the tool in the event of excessive projection of said stud beyond said predetermined penetration, said cylinder being of a length to be only partially deformable during excessive projection from said die under the impetus of said gas, whereby both said cylinder and stud are simultaneously and gradually decelerated to a stop adjacent said muzzle in captive relationship with respect to said tool.

4. In combination with an explosive operated tool of the type having a barrel of given caliber that projects subcaliber fasteners with a penetrating shank at high velocity from the muzzle of the barrel into a surface of a workpiece to a predetermined penetration of said shank and to leave a normally unimpaled rear portion of said fastener, a piston substantially of barrel caliber slidably engaged in said barrel and having an axial workable length of plastically deformable material at least at one end of said piston engagable to the trailing end of said rear portion of said fastener for applying the projecting force of the explosive to said fastener, a safety device attached to said tool and including a guideway and movable abutment means mounted in said guideway in operative relationship to said muzzle for movement between a position at which said abutment means forms a muzzle orifice and constriction for normally passing said fastener but for working said piston length at least partially around said piston with deformation at least radially into said trailing end for simultaneous piston and fastener retention to prevent completely free flight of both linked together by said deformation and with said tool in captive relationship, and a position whereat said abutment means is out of the path of said piston to enlarge said orifice and allow withdrawal of said piston from said barrel and device, said safety device including means for mounting and moving said abutment means in said guideway between said positions.

5. The combination of claim 4 wherein the piston is a metallic circular cylinder plastically deformable relative to the fastener and abutment means, larger in diameter than the trailing end of the rear portion of the fastener and concentrically recessed at least at one end of said cylinder to provide a recess for axial reception and extraction of said trailing end, said cylinder having the axial workable length from about 1½ to 3 inches to be deformable at least at said recess but over only part of said length to maintain, in association with the explosive projecting force for the given barrel caliber, the captive relationship thereby forming a link between the abutment means and the fastener in the event of excessive fastener projection beyond said predetermined penetration for gradually stopping the fastener, and wherein the constriction formed by said abutment means extends substantially concentrically and substantially completely circumferentially about the orifice.

6. In an explosive-actuated stud driving tool, a barrel having a bore for passage of a subcaliber stud at high velocity for projection therefrom into a workpiece with a predetermined penetration under the impetus of sudden expansion of gas generated within said bore by an explosive cartridge, deformable means slidably carried in said bore in obturating relationship between said cartridge and stud and adapted to be acted on by said gas for driving said stud, a socket at an end of said deformable means for receiving the trailing end portion of said stud in telescoped relationship and maintaining said stud in substantial alignment with the axis of said bore and orificed abutment means pivotally secured on said tool at the muzzle of said barrel in one position for passing only said driven stud through said orifice and plastically deforming part of said deformable means into firm engagement with said stud from the beginning of excessive penetration of said driven stud beyond said predetermined penetration, said deformable means being of sufficient length for simultaneously and gradually stopping both said deformable means and retained stud with an undeformed portion remaining in captive relationship with respect to said deformed part and abutment means, said abutment means being movable to an open position after driving to permit said deformable means and stud to be removed from said tool.

7. For slidable reception in an explosive load actuated stud-driving tool of the type described, a stud driving piston of extrudable material plastically deformable during passage of said piston through an extrusion die adjacent the muzzle of the tool barrel in the event of excessive overpenetration of said stud into a workpiece, said piston being recessed at one end for slidably receiving the trailing normally unimpaled end of said stud into partially sheathed normally detachable relationship said piston having a diameter such that the resultant deformation of said piston in its passage through said die forms a grip adjacent said stud trailing end and prevents complete passage of said piston unhindered through said die under the maximum explosive load employed for actuation.

8. The piston of claim 7 wherein the open end of the recess is flared to facilitate reception of said stud.

9. The piston of claim 7 wherein both ends are recessed to render the piston reversible.

10. The piston of claim 7 wherein at least the outer die opening engaging surface is coated.

11. The piston of claim 7 wherein the coating is copper and the piston is soft steel.

12. In a tool for driving a stud to a predetermined penetration into a workpiece by the sudden expansion of gas within the bore of a barrel, means adapted for reception in the barrel between said stud and expanded gas for driving said stud toward the muzzle of the barrel in substantial obturating relationship with a portion of said bore adjacent its breech, abutment means secured on said tool and mounted at said muzzle of the barrel, said abutment means having an orifice of a size sufficient to pass said stud but insufficient to pass said driving means whereby said abutment and driving means are adapted to be put into operative abutting relationship only when said stud meets unexpected lack of resistance by said workpiece and travels beyond said muzzle in excess of said predetermined penetration, said driving means being recessed at least at the end adjacent said stud for reception of said end of the stud in said recess and consisting of a material plastically deformable at least adjacent said recess by said abutment means thereby forming a grip on said overtraveled stud and being of a length to form a captivating link between said stud and said abutment means, said bore having an oversized portion adjacent said muzzle to enable easy removal of said driving means from said barrel and a sizing restriction intermediate said portions for ironing out any bulging of said driving means adjacent said recess from prior recurrent usage and enabling further usage of said means while undeformed by said abutment means.

13. In an expanding gas operated stud driving tool, a tool barrel and a tool housing axially movable relative to said barrel between an extended safety position at which the tool is inoperative and a telescoped ready-to-fire position at which the tool held thrust against a workpiece is operative for ejecting said stud through the bore of the barrel at a velocity adapted to effect a predetermined penetration of the stud into said workpiece beyond the muzzle of the barrel, a stud driving cylinder adapted to be slidably received in said bore, said bore being of a length adapted for receiving and driving not only said stud but also said driving cylinder in tandem, said cylinder being plastically deformable over a length of at least about 1½ inches and recessed at an end and having a diameter at least at said recessed end fitting said bore in slidable relationship and larger than the largest transverse dimension of an adjacent end portion of said stud, said recess being adapted for reception of said stud end portion in normally detachable relationship, and jaws movably mounted on said tool in secured relationship to said tool for articulation of said members into an operative position defining an orifice at the muzzle of the barrel, said orifice being of a size permitting passage of said stud for said predetermined workpiece penetration, but extending into the path of said cylinder for preventing passage of said cylinder when said tool housing and jaws have been moved to said operative positions, thereby effecting a deformation of said cylinder by said jaws and compressing the recessed end of the cylinder into a firm grip about said end of the stud thereby stopping it gradually, said moveably mounted jaws being moveable out of said path to permit removal of said deformed cylinder and retained stud from the barrel bore when the housing is moved to said safety position.

14. The tool of claim 13 wherein the jaw members define a relatively short cylindrical extrusion orifice having a relatively long conical entry portion for said cylinder and wherein a portion of each member forms a portion of said orifice, said members being pivotally and reciprocatably mounted so as to be positionable in unison between the workpiece to be penetrated and the muzzle of the barrel in clamped relationship, said barrel being axially movable to a limited extent toward and from said members and having a surface portion for abutment with mating surface portions of said jaw members when said barrel is moved toward said jaws for swinging said jaws into articulation and holding said members in articulated operative position so long as said housing is maintained at said ready-to-fire operative position.

15. The tool of claim 13 wherein the jaw members are mounted pivotally between the spaced legs of a yoke member disposed on opposite sides of the barrel, said members being mounted on said barrel in limited axially and pivotally movable relationship upon spaced parallel pivot pins mounted fixedly at their ends in said legs to extend therebetween on opposite sides of said barrel, and an axially extending slot in each jaw member, said slot being rounded at one end, for mounting each said member on one of said pins.

16. The tool of claim 13 wherein the jaw members are mounted pivotally between the spaced legs of a yoke member disposed on opposite sides of the barrel, said members being mounted on said barrel in limited axially movable relationship upon spaced parallel pivot pins mounted slidably at their ends in said legs to extend therebetween on opposite sides of said barrel, and a pair of axially extending slots in each of said legs for mounting said ends of said pins slidably, each of said members having a round hole for mounting each said jaw member on one of said pins pivotally, side bars disposed on opposite sides of said barrel and mounted in fixed relationship to said pins adjacent the ends thereof, said side bars and pins forming a frame having limited axial movement in said slots whereby said members are constrained for axial movement in unison in addition to pivotal movement.

17. In a projectile fastener element driving explosive activated tool wherein the tool has a barrel and a tool housing axially movable relative to said barrel between an extended safety position at which the tool is inoperative and a telescoped ready-to-fire position, at which the tool is operatively positioned in abutment with a workpiece at the transverse muzzle plane of the tool with the barrel bore in substantially square relationship with respect to the surface of the workpiece, said barrel having a bore into which fastening elements may be positioned for projection not in excess of predetermined penetration into a workpiece by gas generated from a fired explosive cartridge, said barrel having means for detachably securing said barrel in readily assembled relationship with said tool, a cartridge chambering breech plug mountable in said bore breech, said plug having a chamber for receiving a cartridge from the rear said chamber longer than said cartridge and ported adjacent the mouth of said plug, a driving piston of plastically deformable material of a size adapted to be slidably receivable in said bore and recessed at the ends to receive the trailing normally unimpaled end of said element in one of said recesses, a pair of jaws each having a part bearing a peripheral portion of a die opening for deforming said piston in the event of said excessive penetration, means for positioning said jaws adjacent said muzzle comprising a yoke member having legs disposed on opposite sides of said barrel in forwardly extending relationship to said muzzle plane and a bight portion connecting said legs, said bight having an aperture for movably mounting said yoke member with respect to said barrel in the axial direction, and cross pins on said legs for mounting said jaws between the legs, one of said jaw and leg pairs being longitudinally slotted in the axial direction thereby adapting the front of said jaws not only for pivotal movement to permit articulation of said peripheral portions to and out of piston intercepting position, but also for limited axial movement about said muzzle plane including a position ahead of said muzzle plane thereby rendering the tool inoperative when the barrel becomes excessively out of square and rendering the tool operative when in said read-to-fire position with the front of the jaws substantially in the muzzle plane, said barrel having an enlargement adjacent the muzzle larger than said aperture in the bight and disposable between said bight and said jaws and being of less axial extent than the axial spacing between said bight and die peripheral portion to limit the axial movement of said yoke member and jaws with respect to said barrel, said jaws having cutaway portions adjacent said barrel muzzle to clear said enlargement to permit said peripheral portions to swing apart, said barrel enlargement having a nose portion tapering to a convergence at the front end of the barrel to provide further clearance with said cut-away portion of said jaws to permit maximum separation of the die opening periphery to pass said piston when said nose portion is withdrawn from said die portion and to provide a pilot for swinging the jaws to close the die opening when said nose portion and jaws are in axial closest proximity, said enlargement having lateral camming surfaces engageable with said jaws in said position of closest proximity to lock the jaws into said die closed position when the front of the jaws are in abutment with the surface of the workpiece and the front end of the barrel is in abutment with the die opening periphery of the jaws at said ready-to-fire position.

References Cited in the file of this patent

UNITED STATES PATENTS

| | | |
|---|---|---|
| Re. 23,569 | Sopris | Oct. 28, 1952 |
| 2,064,129 | Temple | Dec. 15, 1936 |
| 2,622,243 | Temple et al. | Dec. 23, 1952 |
| 2,663,259 | Catlin et al. | Dec. 22, 1953 |
| 2,767,398 | Pfaff et al. | Oct. 23, 1956 |
| 2,852,843 | Banta et al. | Sept. 23, 1958 |
| 2,891,249 | Kopf et al. | June 23, 1959 |
| 2,925,602 | Jopf et al. | Feb. 23, 1960 |

FOREIGN PATENTS

| | | |
|---|---|---|
| 506,755 | Belgium | Nov. 14, 1951 |
| 166,735 | Australia | Jan. 31, 1956 |